United States Patent
Turgut

(10) Patent No.: US 7,471,592 B2
(45) Date of Patent: Dec. 30, 2008

(54) METHOD AND APPARATUS FOR PASSIVE ACOUSTIC RANGING

(75) Inventor: Altan Turgut, Fairfax, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 204 days.

(21) Appl. No.: 11/080,975

(22) Filed: May 10, 2005

(65) Prior Publication Data

US 2006/0256659 A1 Nov. 16, 2006

(51) Int. Cl.
*G01S 3/80* (2006.01)

(52) U.S. Cl. .................. 367/129; 367/124; 367/118

(58) Field of Classification Search .......... 367/118, 367/124, 129
See application file for complete search history.

(56) References Cited

U.S. PATENT DOCUMENTS

| | | | |
|---|---|---|---|
| 3,069,654 A | 12/1962 | Hough et al. | |
| 5,040,157 A * | 8/1991 | Roderick et al. | 367/124 |
| 5,615,175 A * | 3/1997 | Carter et al. | 367/124 |
| 6,690,618 B2 * | 2/2004 | Tomasi et al. | 367/124 |

OTHER PUBLICATIONS

Harrison, C., "Effective Parameters for Matched Field Geoacoustic Inversion in Range-Dependent Environments" IEEE Jorunal of Oceanic Engineering,vol. 28,No. 3Jul. 2003 p. 432-445.

Al-Kurd, A. "Performance analysis of the holographic array processing algorithm" Acoustical Society of America 97 (3), Mar. 1995 p. 1747-1763.

Mourad, P. "Source localization using a reference wave to correct for oceanic variability" J. Acoust. Soc. AM. 96 (2), Pt. 1 Aug. 1992 p. 1030-1039.

Siderius, M. "Multipath compensation in shallow water environments using a virtual receiver" J. Acoust. Soc. AM. 102 (6), Dec. 1997 p. 3439-3449.

Thode A. "Source ranging with minimal environmental information using a virtual receiver and waveguide invariant theory" J. Acoust Soc. Am. 108 (4), Oct. 2000 p. 1582-1594.

Brekhovskikh, L. "Fundamentals of Ocean Acoustics" Springer-Verlag New York, Inc. 2003.

* cited by examiner

*Primary Examiner*—Ian J Lobo
(74) *Attorney, Agent, or Firm*—John J. Karasek; Suresh Koshy

(57) ABSTRACT

An apparatus for range-estimating a noise source including a first passive, vertical hydrophone array of at least two receivers at a first distance from the noise source. The apparatus includes a second passive, vertical hydrophone array of at least two receivers at a second distance from the noise source. The apparatus also includes a processor communicating with the first passive, vertical hydrophone array and the second passive, vertical hydrophone array to determine a ratio of the first distance to the second distance.

5 Claims, 3 Drawing Sheets

METHOD AND APPARATUS FOR PASSIVE ACOUSTIC RANGING

TECHNICAL FIELD

This invention relates generally to a method and apparatus for acoustic ranging, and, more particularly, to a method and apparatus for passive acoustic ranging in a waveguide using vertical hydrophone arrays.

BACKGROUND ART

Most of the current approaches to the range estimation of an acoustic noise source are based on numerical simulations of acoustic propagation through the ocean, e.g., Matched Field Processing ("MFP") algorithms. These algorithms require precise knowledge of the propagation environment, such as sound speed, density, and attenuation as a function of range and depth, so that simulated and received acoustic fields can be matched for range estimation. In practice, range estimation by MFP-based methods become problematic due to the lack of knowledge of the environmental parameters. Several researchers adopted the guide-source concept from astronomy to calibrate the propagation environment with a known source. Rouseff (1989) and Al-kurd and Porter (1995) used a holographic array by using a guide source transmitting a continuous wave ("CW") signal at different water depths. D. Rouseff, "Ocean Acoustic Holography: Using a Reference Source to Remove Oceanographic Variability," Applied Physics Laboratory, University of Washington, Seattle (1989), incorporated herein by reference. A. Al-kurd and R. Porter, "Performance analysis of the holographic array processing algorithm, "Ocean Acoustic Holography: Using a reference source to remove Oceanographic variability," J. Acoust. Soc. Am., 97(3), 1747-1763, (1995), incorporated herein by reference. Siderius et al. (1997) used a broadband guide source at a fixed water depth. M. Siderius, D. Jackson, D. Rouseff, and R. Porter, "Multipath compensation in shallow water environments using a virtual receiver," J. Acoust. Soc. Am., 102(6), 3439-3449, (1997), incorporated herein by reference. Such methods require the knowledge of the environmental parameters between the guide source and the target. Thode (2000) used a broadband guide source at a fixed depth and created a 'virtual receiver array' by using the waveguide invariant theory. M. Thode, "Source ranging with minimal environmental information using a virtual receiver and waveguide invariant theory," J. Acoust. Soc. Am., 108(4), 1582-1594, (2000), incorporated herein by reference.

DISCLOSURE OF THE INVENTION

According to an embodiment of the instant invention, an apparatus for range-estimating an acoustic noise source in a waveguide includes a first passive, vertical hydrophone array of at least two receivers at a distance from the noise source. The apparatus also includes a second passive, vertical hydrophone array of at least two receivers at a second distance from the noise source. The apparatus further includes a processor communicating with the first passive, vertical hydrophone array and the second passive, vertical hydrophone array to determine a ratio of the first distance to the second distance.

Optionally, the processor determines a virtual array output of the first, passive, vertical hydrophone array and the second, passive, vertical hydrophone array. Optionally, the processor maps the virtual array output as a function of angular frequency and angular frequency shift. Optionally, the virtual array output includes a plurality of patterns of acoustic intensity level curves, the processor determining the ratio of the first distance to the second distance based at least in part on the plurality of patterns of acoustic intensity level curves.

According to an embodiment of the instant invention, a method includes a) detecting a first acoustic noise source at a first, passive, vertical hydrophone array of at least two receivers, the first acoustic noise source being located at a first distance from the first hydrophone array. The method also includes b) detecting a second acoustic noise source at a second, passive, vertical hydrophone array of at least two receivers, the second acoustic noise source being located at a second distance from the second hydrophone array. The method further includes c) determining a virtual array output from the first hydrophone array and the second hydrophone array. The method additionally includes d) determining a ratio of the first distance to the second distance based at least in part on the virtual array output.

Optionally, the ratio determining step d) includes mapping the virtual array output as a function of angular frequency and angular frequency shift. Optionally, the mapping step includes determining an acoustic intensity virtual array output based on the virtual array output and includes a plurality of acoustic intensity level contours, the plurality of acoustic intensity level contours being a function of the angular frequency and the angular frequency shift. Optionally, the ratio determining step d) determining a plurality of contours of constant acoustic intensity levels in the mapped virtual array output; and determining a ratio of the first distance to the second distance and a waveguide invariant parameter from the plurality of contours of constant acoustic intensity levels. Optionally, the ratio determining step d) includes transforming the acoustic intensity virtual array output from an angular frequency and an angular frequency-shift domain to a parameter domain using a Hough Transform and a formula defining a plurality of contours of constant acoustic intensity levels, thereby generating a two-dimensional parameter space; and determining a maximum in the two-dimensional parameter space, the maximum relating to a ratio of the first distance to the second distance and a waveguide invariant parameter.

An embodiment of the instant method estimates the target range without required knowledge of certain environmental parameters. An embodiment of the instant method uses the waveguide invariant theory to form virtual receiver arrays by using several lightly populated hydrophone arrays. An embodiment of the instant method is passive and does not require an active source, and can be used for locating a source in range and/or bearing with a few lightly populated vertical hydrophone arrays.

BEST MODES OF CARRYING OUT THE INVENTION

Figure 1:
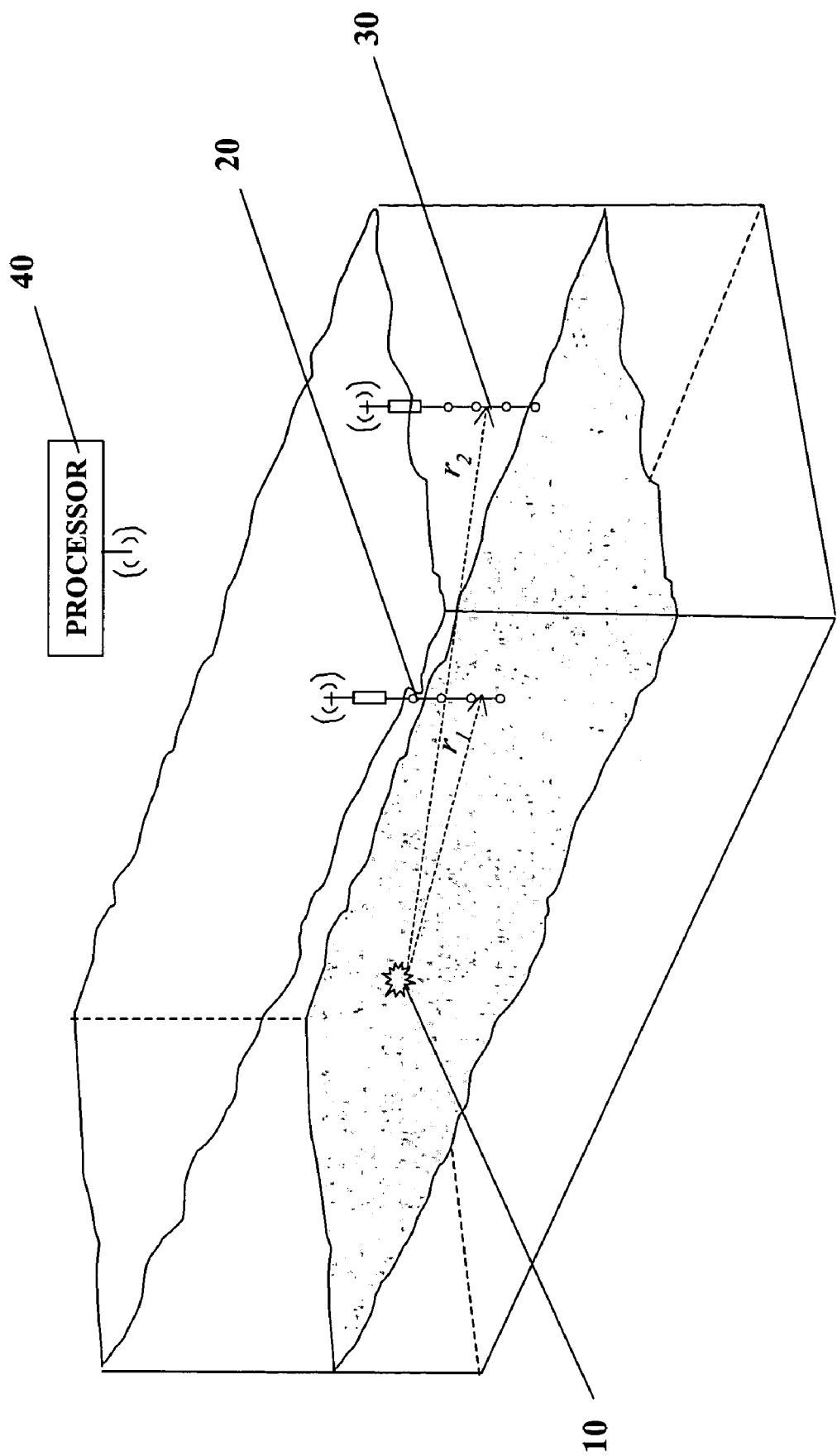
FIG. 1 is a perspective view of an embodiment of the invention in situ.

According to an embodiment of the instant invention, geometry of a range-ratio estimation apparatus in a body of water forming an acoustic waveguide is shown, for example, in FIG. 1. A broadband noise source 10 is range-estimated using a first Vertical Line Array ("VLA") 20 at a distance $r_1$ from the noise source 10, and a second VLA 30 at a distance $r_2$ from the noise source 10. Each VLA includes two or more hydrophone receivers. FIG. 1 shows VLAs having four hydrophone receivers, by way of illustration only. Hydrophone receivers for the VLAs 20, 30, for example, include omni-directional sensors having a flat frequency response within the frequency band of interest.

The VLAs 20, 30 communicate with a processor 40 that determines the range-ratio estimation. The acoustic pressure field for a single source received at the two VLAs 20, 30 can be expressed as two pressure-field vectors. A virtual receiver output can be defined by a Bartlett matched-field processor as the inner product between the received pressure-field vectors. A virtual array output is obtained by shifting one of the pressure-field vectors in frequency. This frequency shift effectively generates a horizontal aperture of a virtual array by means of the waveguide invariant theory. See, e.g., Brekhovskikh, L. M., and Lysanov, Y. P., *Fundamentals of Ocean Acoustics,* 2nd ed. (New York, Springer), 1991, incorporated herein by reference.

For first VLA 20 and second VLA 30, the virtual receiver output at range $r_2$ from the first VLA 20 is defined as:

$$V(z_s, r_1, r_2, \omega) = \frac{\sum_n p_2^*(z_n, z_s, r_2, \omega) p_1(z_n, z_s, r_1, \omega)}{\sqrt{\left|\sum_n p_2^*(z_n, z_s, r_2, \omega)\right|^2}\sqrt{\left|\sum_n p_1(z_n, z_s, r_2, \omega)\right|^2}}, \quad (1)$$

where $\omega$ is the angular frequency, $z_s$ is the noise source depth, $z_n$ is the depth of the nth hydrophone receiver, and $p_1$ and $p_2$ are the pressure fields received at the first VLA 20 and the second VLA 30, respectively.

Expressing the pressure fields by normal mode expansion, the virtual receiver output at range $r_2$ from the first VLA 20 can be written as:

$$V(z_s, r_1, r_2, \omega) = N \sum_l e^{-\alpha_l(r_1+r_2)} \phi_l^2(z_s, \omega) \frac{e^{ik_l(\omega)(r_1-r_2)}}{|k_l(\omega)|}, \quad (2)$$

where N is the normalization constant, $\alpha_l$, $\phi_l$, and $k_l$ are the attenuation coefficient, the mode function, and the horizontal wavenumber of mode order l, respectively. This expression is similar to the acoustic pressure received at range $r'=r_1-r_2$ from the noise source except for the extra attenuation term and $k_l(\omega)^{-1/2}$ factor. By multiplying the above expression by its complex conjugate, an acoustic intensity virtual receiver output can be obtained as $$I_V(z_s, r_1, r_2, \omega) = N^2 \sum_l \sum_m \Phi_l \Phi_m e^{-(\alpha_l+\alpha_m)(r_1+r_2)} \cos[(r_1+r_2)\Delta k_{lm}(\omega)], \quad (3)$$

where $\Delta k_{lm} = k_l - k_m$, and $\Phi_i = \phi_i(z_s,\omega)^2/k_i$. Similarly, by introducing slight frequency shift $\omega_s$ on the pressure $p_2$, the acoustic intensity virtual array output can be constructed as $$I_V(z_s, r_1, r_2, \omega, \omega_s) = \\ N^2 \sum_l \sum_m \Phi_l \Phi_m e^{-(\alpha_l+\alpha_m)(r_1+r_2)} \cos[\Delta k_{lm}(\omega+\omega_s)r_1 - \Delta k_{lm}(\omega)r_2]. \quad (4)$$

The definition of waveguide invariant $\beta$ as the ratio of modal phase slowness to group slowness yields $$\beta = \frac{d(1/c_p)}{d(1/c_g)} = \frac{\Delta k_{lm}(\omega)/\omega}{\partial \Delta k_{lm}(\omega)/\partial \omega}, \quad (5)$$

where $c_p$ is the modal phase speed, and $c_g$ is the modal group speed. If $\beta$ is assumed to be constant, the horizontal wavenumber differences at different frequencies can be related by the solution of the above differential equation, $\Delta k_{lm}(\omega) = C_{lm}\omega^{-1/\beta}$, as $$\frac{\Delta k_{lm}(\omega+\omega_s)}{\Delta k_{lm}(\omega)} = \left(\frac{\omega+\omega_s}{\omega}\right)^{-1/\beta} \quad (6)$$

Then, the acoustic intensity virtual array output can be rewritten as $$I_V(z_s, r_1, r_2, \omega, \omega_s) = \\ N^2 \sum_l \sum_m \Phi_l \Phi_m e^{-(\alpha_l+\alpha_m)(r_1+r_2)} \cos[\{r_1 - (1+\omega_s/\omega)r_2\}\Delta k_{lm}(\omega)]. \quad (7)$$

Figure 2:
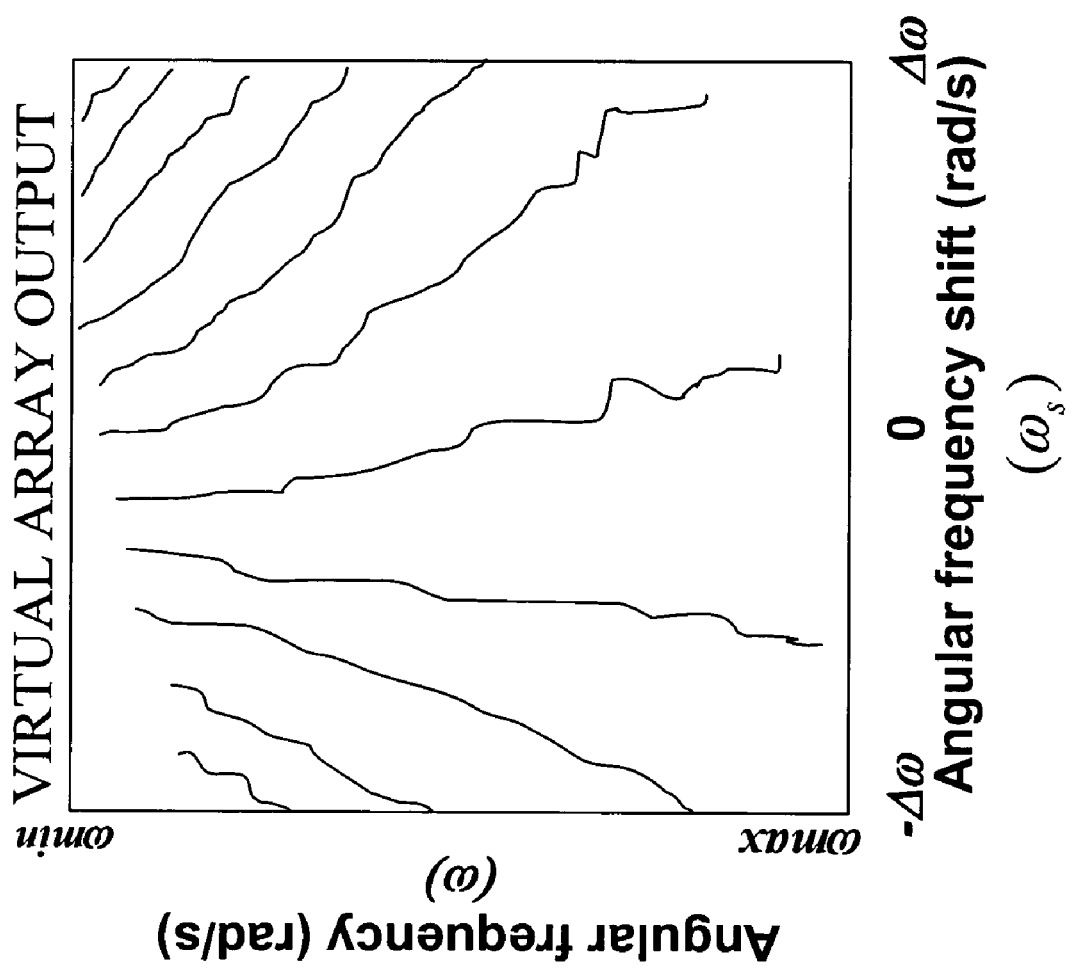
FIG. 2 is an illustrative graph of a virtual array output.

For given noise source ranges $r_1$ and $r_2$, the virtual array output in the previous equation exhibits striations when it is mapped as a function of $\omega_s$ and $\omega$. Contours of constant acoustic intensity levels in the virtual array output can be calculated by setting the total differential to zero $$dI_v = \frac{\partial I_v}{\partial \omega}\Delta\omega + \frac{\partial I_v}{\partial \omega_s}\Delta\omega_s = 0, \quad (8)$$

from which the slope along the contours of constant acoustic intensity levels can be calculated as $$\left(\frac{\Delta\omega_s}{\Delta\omega}\right)_{contour} = -\frac{\partial I_v/\partial \omega}{\partial I_v/\partial \omega_s} = q(1+\omega_s/\omega)^{(1+1/\beta)} - 1, \quad (9)$$

where $q = r_1/r_2$. Considering $\omega_s/\omega \ll 1$, an approximate solution to the above differential equation can be found as $$\omega = \frac{(1-q)\omega}{} + \omega_\wedge \omega^{q(1+1/\beta)}. \quad (10)$$

where $\omega_0$ is the integration constant. The parameters q and $\beta$ can be estimated by the Hough transform method by mapping the virtual array output to parameter domain. U.S. Pat. No. 3,069,654 to P. V. C. Hough, entitled "Method and means for recognizing complex patterns," is incorporated herein by reference. A complex global detection problem in the image domain is converted into a more elegant local peak detection problem by means of the Hough Transform. Eq. (10) describes the level curves to be detected in the virtual array output, as shown, for example, in FIG. 2 with the parameters q and $\beta$. Ideally, an integral of intensities in the virtual array output along the curves described by Eq. (10) is mapped to a point (q, β) in the parameter space as $$H(\omega_0,q,\beta)=\int I(\omega,\omega_s)ds, \quad (11)$$

where $I(\omega,\omega_s)$ is the intensity at point $(\omega,\omega_s)$ in the virtual array output and ds is the incremental length along the curves described in Eq. (10). Note that $H(\omega_0,q,\beta)$ will be sinusoidal function of $\omega_0$ if the parameters q and β represent an interference pattern in the virtual array output. The variance, or energy, of this sinusoidal function determines how well the interference patterns are represented by a family of curves described by parameters q and β in Eq. (10). The total intensity along each curve is squared and normalized by the curve length, and the total variance is obtained by summation over $\omega_0$, representing a family of curves, as $$\overline{H}(q,\beta) = \sum_{\omega_0} \frac{\left(\int I(\omega,\omega_s)ds\right)^2}{\int ds}. \quad (12)$$

Figure 3:
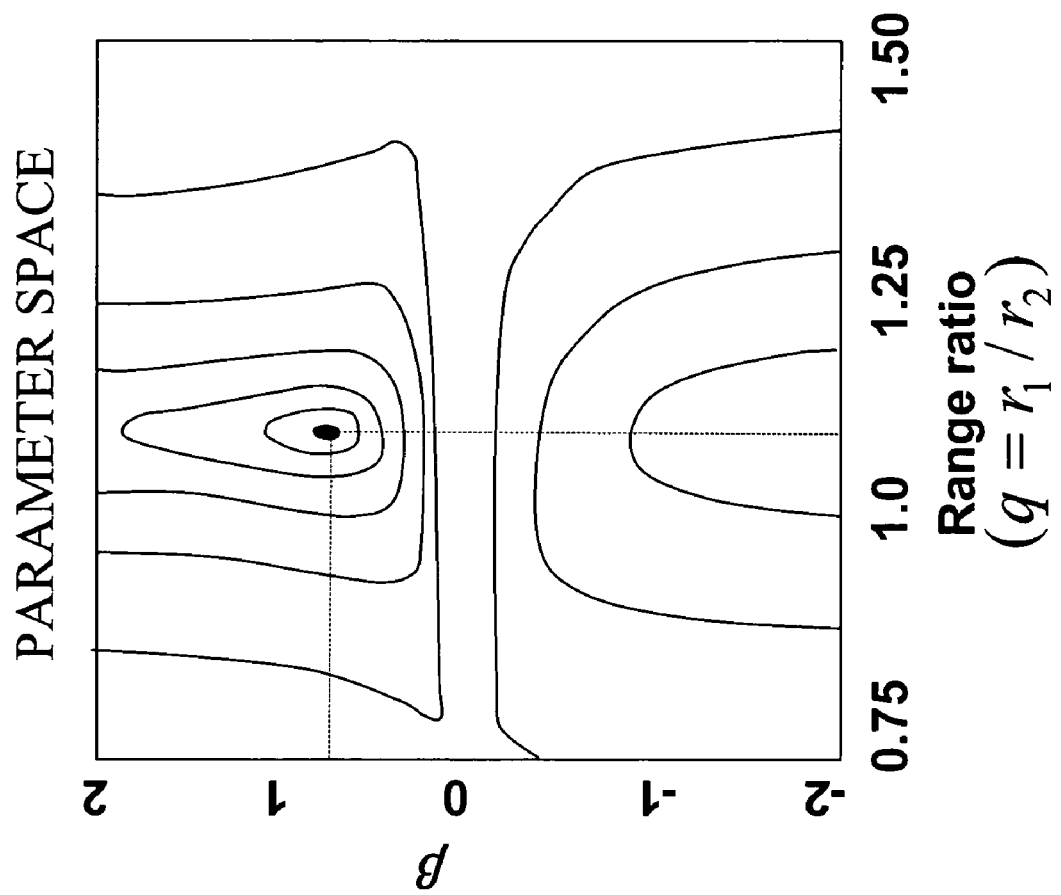
FIG. 3 is an illustrative graph of a parameter space.

Note that the calculated total variance in 2-dimensional parameter space is expected to have a global maximum when the interference pattern is best represented by Eq. (10) with the estimated values of parameters q and β, as shown by way of illustration in FIG. 3. FIG. 3 shows illustrative energy levels in the parameter space, and parameter estimation can be obtained from the maximum energy level.

An operational guideline of an exemplary embodiment of the instant invention is described as follows:

1) Deploy up to four lightly populated VLAs (for example, as buoys or bottom mounted sensors) in littoral waters (optionally with standard GPS navigation and standard radio telemetry capabilities for buoys, and standard acoustic telemetry capability for the bottom mounted sensors).
2) Calculate the virtual array outputs by using Eq. (7) for individual pair of VLAs.
3) Map the virtual array output to (q,β) parameter domain by the Hough Transform method.
4) Determine the parameters q and β by finding a maximum of Hough Transform output in the parameter domain.
5) In three-dimensional configurations, exact source localization in horizontal plane is obtained using the range ratios obtained from four VLAs deployed pseudo-randomly in the littoral waters. Three VLAs provide two possible source locations in the horizontal plane. Two VLAs provide circles of possible locations.
6) Ideally, two VLAs should be deployed at the same water depths and spacing between each hydrophone should be the same for each array. However, if the water depth of the first VLA is $H_1$ and water depth of the second VLA is $H_2$, depths of each receiver on first VLA and second VLA should be adjusted as $z_1{}^i=z_2{}^i H_2/H_1$, where $z_1{}^i$ is the depth of the i-th hydrophone on the first VLA and $z_2{}^i$ is the depth of the i-th hydrophone on the second VLA. In addition, an approximate scaling formula $q'=r_1 H_2/r_2 H_1=q H_2/H_1$ should be used for the range correction. Similar types of scaling formulas have been used for a single source and receiver VLA configuration in matched field geoacoustic inversions by C. Harrison and M. Siderius, "Effective parameters for matched field geoacoustic inversion in range-dependent environments", IEEE, J. Ocean. Eng., v. 28, p 432-445, 2003, incorporated herein by reference.

Obviously, many modifications and variations of the present invention are possible in light of the above teachings without departing from the true scope and spirit of the invention. It is therefore to be understood that the scope of the invention should be determined by referring to the following appended claims.

What is claimed is:

1. An apparatus for range-estimating an acoustic noise source in a waveguide comprising:
    a first passive, vertical hydrophone array of at least two receivers at a distance from the noise source;
    a second passive, vertical hydrophone array of at least two receivers at a second distance from the noise source; and
    a processor determining a first pressure field from said first passive, vertical hydrophone array, determining a second pressure field from said second passive, vertical hydrophone array, generating an acoustic intensity virtual array output from said first pressure field and said second pressure field, and determining a ratio of said first distance to said second distance from said acoustic intensity virtual array output.

2. The apparatus according to claim 1, wherein said processor maps the acoustic intensity virtual array output as a function of angular frequency and angular frequency shift.

3. The apparatus according to claim 2, wherein the acoustic intensity virtual array output comprises a plurality of patterns of acoustic intensity level curves,
    said processor determining the ratio of the first distance to the second distance based at least in part on the plurality of patterns of acoustic intensity level curves.

4. An apparatus for range-estimating an acoustic noise source in a waveguide comprising:
    a first passive, vertical hydrophone array of at least two receivers at a distance from the noise source:
    a second passive, vertical hydrophone array of at least two receivers at a second distance from the noise source; and
    a processor communicating with said first passive, vertical hydrophone array and said second passive, vertical hydrophone array to determine a ratio of said first distance to said second distance,
    wherein said processor is operable to generate a horizontal aperture of a virtual array from said first, passive, vertical hydrophone array and said second, passive, vertical hydrophone array,
    wherein said processor is operable to map the horizontal aperture of a virtual array as a function of angular frequency and angular frequency shift.

5. The apparatus according to claim 4, wherein the virtual array output comprises a plurality of patterns of acoustic intensity level curves,
    said processor determining the ratio of the first distance to the second distance based at least in part on the plurality of patterns of acoustic intensity level curves.

* * * * *